(12) United States Patent
Blount (10) Patent No.: US 7,937,310 B1
(45) Date of Patent: May 3, 2011

(54) SYSTEM AND METHOD FOR PROVIDING EFFICIENCY AND STABILITY TO SECURITIES FINANCING MARKETPLACE

(76) Inventor: Edmon W. Blount, Colchester, VT (US)

(*) Notice: Subject to any disclaimer, the term of this patent is extended or adjusted under 35 U.S.C. 154(b) by 744 days.

(21) Appl. No.: 11/404,385

(22) Filed: Apr. 14, 2006

Related U.S. Application Data (60) Provisional application No. 60/671,385, filed on Apr. 14, 2005.

(51) Int. Cl.
*G06Q 40/00* (2006.01)

(52) U.S. Cl. ............... 705/36; 705/35; 705/37; 705/39; 705/44

(58) Field of Classification Search .............. 705/35–45; 700/90; 713/150–194
See application file for complete search history.

(56) References Cited

U.S. PATENT DOCUMENTS

| | | | | |
|---|---|---|---|---|
| 5,940,812 | A * | 8/1999 | Tengel et al. ................ | 705/38 |
| 5,966,699 | A * | 10/1999 | Zandi ........................... | 705/38 |
| 6,233,566 | B1 * | 5/2001 | Levine et al. .............. | 705/36 R |
| 6,484,153 | B1 * | 11/2002 | Walker et al. ............... | 705/38 |
| 7,310,616 | B2 | 12/2007 | Sugahara | |
| 7,349,881 | B1 | 3/2008 | Lockwood | |
| 7,395,239 | B1 * | 7/2008 | Riseman ....................... | 705/38 |
| 2002/0107765 | A1 * | 8/2002 | Walker ......................... | 705/35 |
| 2003/0009409 | A1 | 1/2003 | Horner et al. | |
| 2003/0033242 | A1 * | 2/2003 | Lynch et al. ................. | 705/38 |
| 2005/0131801 | A1 * | 6/2005 | Glodjo ......................... | 705/37 |
| 2005/0131802 | A1 * | 6/2005 | Glodjo ......................... | 705/37 |
| 2006/0155639 | A1 * | 7/2006 | Lynch et al. ................. | 705/38 |
| 2008/0052214 | A1 | 2/2008 | Martinez et al. | |
| 2008/0228661 | A1 | 9/2008 | Silitch et al. | |
| 2009/0030826 | A1 | 1/2009 | Peckholdt et al. | |
| 2009/0076971 | A1 * | 3/2009 | Witchel et al. .............. | 705/80 |
| 2009/0076972 | A1 * | 3/2009 | Witchel et al. .............. | 705/80 |
| 2009/0132429 | A1 | 5/2009 | Groz | |
| 2009/0276370 | A1 | 11/2009 | Olson et al. | |

OTHER PUBLICATIONS

"Wachovia Enters New Institutional Clearing Services Business", PR Newswire, New York: Apr. 13, 2005, p. 1.*

* cited by examiner

*Primary Examiner* — Ella Colbert
*Assistant Examiner* — Hai Tran
(74) *Attorney, Agent, or Firm* — Diehl Servilla LLC; Glen M. Diehl (57) ABSTRACT

The present invention provides a system and method for providing matching buyers and sellers of securities. The system and method of the present system provides auction services over a network. A list of designated counterparties is maintained by each of a plurality of lenders. Another list of designated counterparties is maintained by each of a plurality of borrowers. Another list of preferred characteristics (preferences) that a potential borrower would have is maintained by each of a plurality of lenders. Another list of preferred characteristics (preferences) that a potential lender would have is maintained by each of a plurality of borrowers. These lists can be updated daily or as frequently as desired. When securities are to loaned, a matching process accesses the appropriate list of designated counterparties to create a list of one or more suggested counterparty. The matching process also accesses the appropriate list of preferred characteristics. Based on the list of preferred characteristics, a search is made of a database of securities lending information to find matches to the preferred characteristics. Based on the matches, the list of one or more suggested counterparties is updated. The suggested list of counterparties is then sent to an intermediary who completes the loan of securities using the matching information.

25 Claims, 5 Drawing Sheets

SYSTEM AND METHOD FOR PROVIDING EFFICIENCY AND STABILITY TO SECURITIES FINANCING MARKETPLACE

STATEMENT OF RELATED CASES

This patent application claims the benefit of priority of U.S. Provisional Patent Application Ser. No. 60/671,385, filed Apr. 14, 2005, which is hereby incorporated by reference.

BACKGROUND OF THE INVENTION

This invention relates to the securities financing and lending activities within the global capital markets system.

At present time, securities lenders and borrowers are matched in a relatively inefficient process that concentrates on personal relationships, credit requirements and securities availability. Most principals in the securities financing markets would prefer to operate initially on the basis of institutional relationships, trading styles, price sensitivities and risk tolerances. Unfortunately, such arrangements are not possible using solely the intermediary structure of custodian banks, lending agents and prime brokers. The banks and agents are shielded from the confidential preferences of the borrowing principals by prime brokers and the latter are shielded from the confidential preferences of lending principals by agents and banks. A way of structuring transactions among principal counterparties based on preferences, while maintaining confidentiality is needed. Moreover, the preferential structure must be maintained within the current infrastructure of the market system since the latter is vastly more efficient when it exploits the strengths of the existing intermediary networks. Finally, the system of preferences will also create the likelihood of stimulating the entry of additional market participants who are currently reluctant to participate fully in the securities financing markets.

Some potential lenders of securities do not make portfolios available for lending out of fear that borrowers will use those resources in ways deleterious to the lender's long-term investment intentions. Some potential borrowers of securities do not enter the market for fear that lenders will recall positions before the economic benefit of their trades is realized. Current market participants rarely achieve the most efficient organization of their needs and availabilities, either through opacity of the investment market or excessive segmentation of desired security positions. In addition, market regulators are presently concerned that excessive risks are being accepted by intermediaries who are not fully cognizant of the potential credit, liquidity and operational risks that are occluded by relationships organized on credit and availability algorithms.

Accordingly, new methods and systems of matching and qualifying securities lenders and borrowers are required. This invention is intended to build upon the existing strengths of the institutional agency and brokerage systems of capital market participants, in adding a layer of trade financing efficiency through pre-qualifying and matching securities lenders and borrowers based upon their demonstrated preferences and counterparty designations.

SUMMARY OF THE INVENTION

The present invention provides a system and method for matching lenders and borrowers of securities. The system and method of the present system provides auction services over a network of capital market participants.

In accordance with one aspect of the present invention, a list of designated counterparties is maintained by each of a plurality of lenders. Another list of designated counterparties is maintained by each of a plurality of borrowers. Another list of preferred characteristics (preferences) that a potential borrower would have is maintained by each of a plurality of lenders. Another list of preferred characteristics (preferences) that a potential lender would have is maintained by each of a plurality of borrowers. These lists can be updated daily or as frequently as desired.

When securities are to loaned, a matching process accesses the appropriate list of designated counterparties to create a list of one or more suggested counterparties. The matching process also accesses the appropriate list of preferred characteristics. Based on the list of preferred characteristics, a search is made of a database of securities lending information to find matches to the preferred characteristics. Based on the matches, the list of one or more suggested counterparties is updated.

The suggested list of counterparties is then sent to an intermediary who completes the loan of securities using the matching information.

The system and method of the present invention improves the efficiencies of the securities lending marketplace. It also stabilizes the marketplace. It further helps participants in the transaction make better informed decisions, thereby helping them manage the potential risks and the potential rewards.

DESCRIPTION OF THE PREFERRED EMBODIMENT

The present invention provides a system and method for qualifying and matching lenders of securities and traders and investors who borrow securities. One of the problems with current loan processes is that it is very difficult, if not impossible, to match the preferences and desires of the originating loan participants. In accordance with one aspect of the present invention, the preferences and desires of hundreds of borrowers and of hundreds of lenders can be matched to provide a more efficient and stable securities marketplace.

In accordance with one aspect of the present invention, method and apparatus provide a preferred financing system for matching borrowers and lenders of securities. While there are many instances when a trader or an investment company may lend securities, the act of short selling frequently creates the need to borrow a security. That is because when investors sell securities that they do not own, the investors must cover the sale by borrowing the security for settlement.

In accordance with another aspect of the system of the present invention, an auction is conducted over a network. Securities lenders, borrowers and intermediaries gain access to each others' requirements, and through preference matching and designations of preferred counterparties, are matched.

The auction is preferably conducted over a network, such as the internet. A server holds information relevant to the securities lending transaction. Participants—borrowers and lenders—connect to the server via client terminals. The server maintains at least two lists for each participant.

A first list includes a list of designated counterparties. For a lender, the list would include designated borrowers to whom the lender would like to loan its securities. For a borrower, the list would include lenders from whom the borrower would like to borrow securities.

A second list includes a list of characteristics or preferences that a party would like a counterparty to have. For example, a lender would like to lend its securities to a borrower that has certain reliability characteristics. For example, the lender might like to loan securities to borrowers who have not defaulted on an loan commitment or who tend to hold their trading positions for a certain length of time. The list of characteristics associated with a particular lender would summarize the characteristics that lender would like the borrower of its securities to have. Conversely, the list of characteristics associated with a particular borrower would summarize the characteristics the borrower would like a lender to have.

The lists are preferably maintained in a server. The lists can be accessed by participants—lenders and borrowers—on an as needed basis. Thus, updates of designated counterparties and preferred characteristics can be performed on an as needed basis. For example, the lists can be updated on a daily basis. The access to the lists is preferably password protected.

Once a transaction is to occur, that is, securities are to be loaned, the present invention uses the lists to determine a qualified counterparties list from one or more suggested matches between a borrower or a lender. To do this, the present invention includes the designated counterparty or counterparties from the specified borrower's or lender's designation lists. Then, the present invention accesses the specified borrower's or lender's list of preferred characteristics. In accordance with one aspect of the present invention, a search of a securities lending database is formulated based on the preferred characteristics. The search is performed and the list of suggested matches is updated based on those lenders (or borrowers as the case may be) that satisfy the specified preferred characteristics.

Thus, in accordance with another aspect of the present invention, a preferred financing system for matching one of a plurality of investors and institutional lenders of investment portfolio securities and for a plurality of traders and investment companies that borrow securities is provided. As previously described, there is a first set of lists of designated recipients and preferred types of recipients of securities made available for lending, the first set of lists including a qualified subset of the plurality of investors and lenders. There is a second set of lists of designated lenders and preferred types of lenders of securities made available for lending, the second set of lists including a qualified subset of the plurality of traders and investment companies. There is a third set of lists, the third set of lists including a list for each of the plurality of lenders, each list in the third set of lists indicating one or more preferred characteristics of a potential borrower for one of the plurality of lenders. There is a fourth set of lists, the fourth set of lists including a list for each of the plurality of traders and investment companies, each list indicating one or more preferred characteristics of a potential lender for one of the plurality of investment companies.

The system includes means for generating one or more suggested matches between one the plurality of lenders and one of the plurality of investment houses in accordance with information in the first list, in the second list, in the third list and in the fourth list. In accordance with a preferred embodiment of the present invention, the means is a software program provided in a server. The means for matching creates one or more suggested matches by including the names of counterparties on a designation list and the names of counterparties that match selected preferences based on a search of a securities lending database.

The system also provides means for communicating the one or more suggested matches to an intermediary, as well as reporting on the validity and currency of the ratings used to score the preferences of participants. The system also includes means for receiving information concerning a securities lending transaction when the securities lending transaction is based on the one or more suggested matches and is consummated. The preferred means is via the interne via a software communications protocol.

In accordance with one aspect of the present invention, the one or more characteristics in a preference list (also known as a preferred characteristic list) is a pre-qualification rating of the degree to which the type of relationship(s) a lender has to a borrower is important. This preference can be used in the preferred characteristic list for each of the lenders and in the preferred characteristic list for each of the borrowers.

In accordance with another aspect of the present invention, one of the one or more characteristics in a preferred characteristic list a pre-qualification rating of the degree to which any prior defaults on a commitment to lend or to consummate a preferred type of securities lending transaction by a lender is important. Again, this preference can be used in the preferred characteristic list for each of the lender and in the preferred characteristic list for each of the borrowers.

In accordance with another aspect of the present invention, one of the one or more characteristics in a preferred characteristic list is the degree to which a crowd of pre-qualified lenders has made available the particular security names and sizes needed by a crowd of borrowers. In this case, the term crowd refers to the plurality of interested, pre-qualified market participants. That is, one of the characteristics in a preferred characteristic list is be the degree to which a crowd of pre-qualified borrowers has stated an interest or a need for the particular security names and sizes made available by crowd of lenders.

In accordance with another aspect of the present invention, one of the one or more characteristics in a preferred characteristic list is the degree to which the qualification rating of investment, collateral management and settlement styles for each pre-qualified available lender is important. Similarly, one of the characteristics in a preferred characteristic list can be the degree to which the qualification rating of trading, collateral management and settlement styles of each pre-qualified needy borrower is important.

In accordance with another aspect of the present invention, one of the one or more characteristics in a preferred characteristic list is the degree to which a qualified, available lender is price sensitive and risk tolerant. Similarly, one of the characteristics in a preferred characteristic list can be the degree to which a qualified, needy borrower is price sensitive and risk tolerant.

In accordance with another aspect of the present invention, one of the one or more characteristics in a preferred characteristic list is the degree to which a qualified, available lender's settlement requirements are important. Similarly, one of the characteristics in a preferred characteristic list can be the degree to which a qualified, interested borrower's settlement requirements are important.

Clearly a number of characteristics can be specified in a preferred characteristics list. Further, the information can be stored in any number of ways. By way of example only, the information can be stored in a list or in a table in a relational database.

Figure 1:
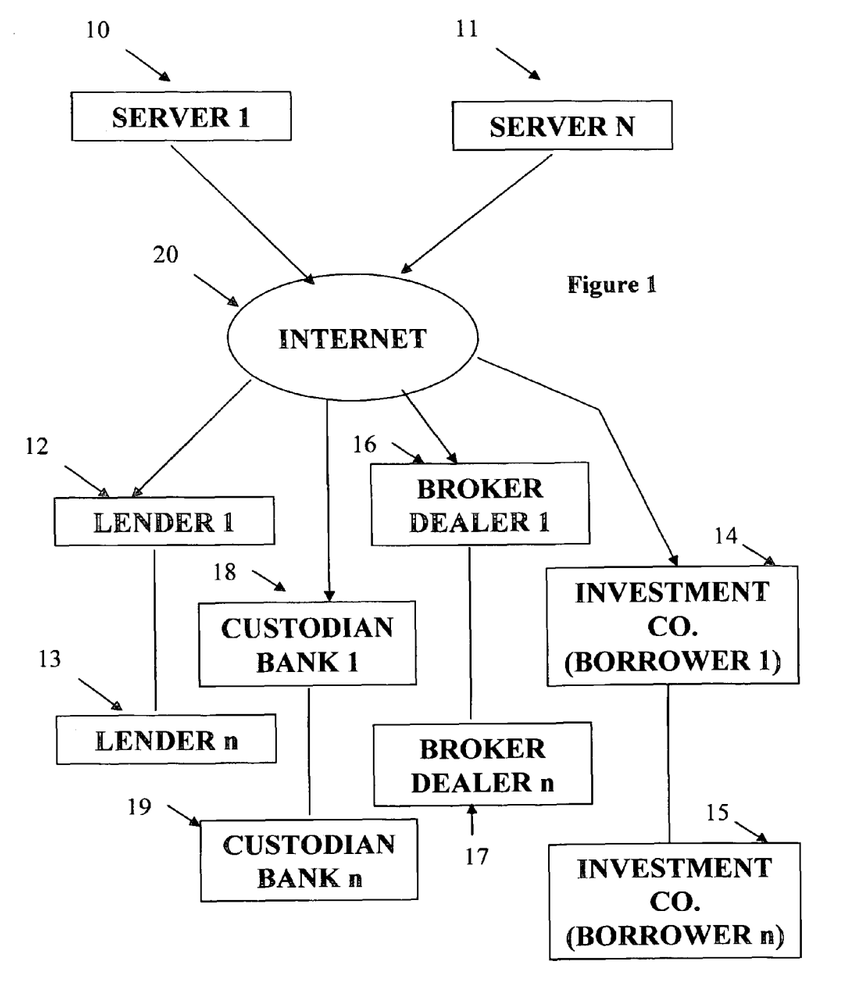
FIG. 1 illustrates a system in accordance with one aspect of the present invention.

Referring now to FIG. 1, a system in accordance with one aspect of the present invention is provided. One or more servers 10 to 11 are connected to a plurality of client terminals 12 to 19 via a network 20, such as the internet. There can be back-up servers as well as a plurality of servers that perform main tasks. It is anticipated that a plurality of servers will be required as this can be a data intensive search for the preferred characteristics.

A plurality of lenders 12 to 13, a plurality of borrowers (investment companies etc.) 14 to 15 and a plurality of intermediaries 16 to 17 connect to the server 10 to 11 via client terminals. A plurality of custodian banks 18 and 19 also connect to the servers.

Each of the lenders maintains an associated list of designated borrower counterparties. If a lender is specified in a transaction, then the matching process of the present invention will search the specified lender's list of designated borrower counterparties and will include those designated borrowers in a list of suggested matches. Each of the plurality of lenders can access the list of designated borrowers via a password protected interface to update the list.

Likewise, each of the borrowers maintains an associated list of designated lender counterparties. If a borrower is specified in a transaction, then the matching process of the present invention will search the specified borrower's list of designated lender counterparties and will include those designated lenders in a list of suggested matches. Each of the plurality of borrowers can access the list of designated lenders via a password protected interface to update the list.

Each of the lenders also maintains an associated list of preferred characteristics that a potential buyer would have. Examples of the preferred characteristics in the list have been previously discussed.

Further, each of the borrowers also maintains an associated list of preferred characteristics that a potential lender would have. Examples of the preferred characteristics in the list have been preferably discussed.

Each of the above lists is preferably stored in one of the servers.

Figure 2:
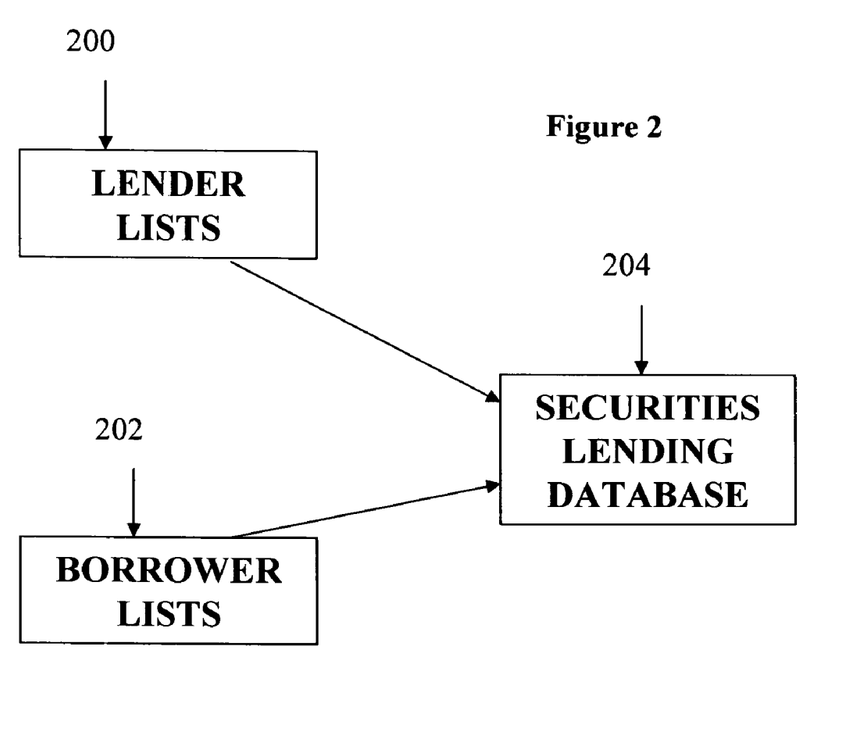
FIG. 2 illustrates the lists and the securities lending database used in accordance with one aspect of the present invention.

Referring to FIG. 2, the lender's lists 200 of preferred characteristics that a potential borrower would have is illustrated. Also shown is the borrower's lists 202 of preferred characteristics that a potential lender would have. The interface of these lists to a database 204 of securities lending information is also shown. The securities lending database has information related to perhaps millions of securities lending transactions that correlates to the information in the lists of preferred characteristics. When a list of suggested matches is needed, the information in the list of preferred characteristics is used to generate a search of the securities lending database. The list of suggested matches is updated based on the results of the search.

Figure 3:
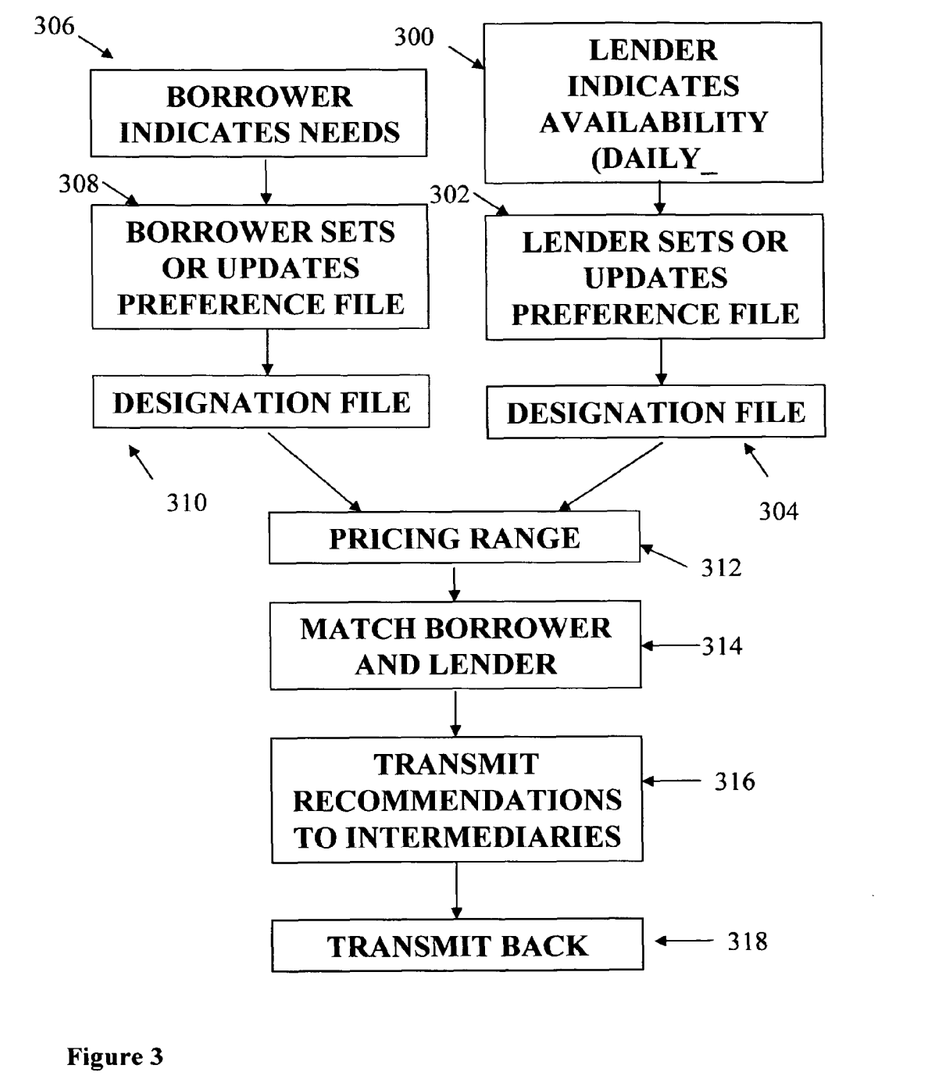
FIG. 3 illustrates the steps performed in accordance with another aspect of the present invention.

Referring to FIG. 3, the steps in accordance with one aspect of the present invention are shown. First, the plurality of lenders specify what they have to lend 300 and either set or update their associated designation list and their associated list of preferred characteristics. See steps 302 and 304. Also, the plurality of borrowers specify their needs in terms of securities in step 306. Each of the plurality of borrowers can also set or update their associated designation list and their list of preferred characteristics. See steps 308 and 310.

Based on the needs of both borrowers and lenders, as well as the appropriate designation lists and lists of preferred characteristics, in the next steps, a list of suggested matches is generated. The list includes the counterparties specified on the appropriate designation list as well as the parties that a search of the securities lending database determines matches the preferred characteristics specified by the appropriate preferred characteristics list.

In the next step 312, a price range of the transaction is set. The price range is based on a search of the securities lending database, showing recent fees and fee-equivalents for similar securities in similar transactions under similar preferences and settlement circumstances.

Then, the list of suggested matches is generated in step 314 and the suggested price range are communicated to an intermediary in step 316 for loan execution and settlement, based on existing relationships and standing contractual terms of the intermediaries and counterparties. The intermediaries can be designated by the participants.

Then, once the securities lending transaction has been consummated, information concerning the transaction is transmitted back to the server. See step 318. That information, or a subset of it, can be used to update the ratings in the securities lending database used to generate the list of suggested matches.

Figure 4:
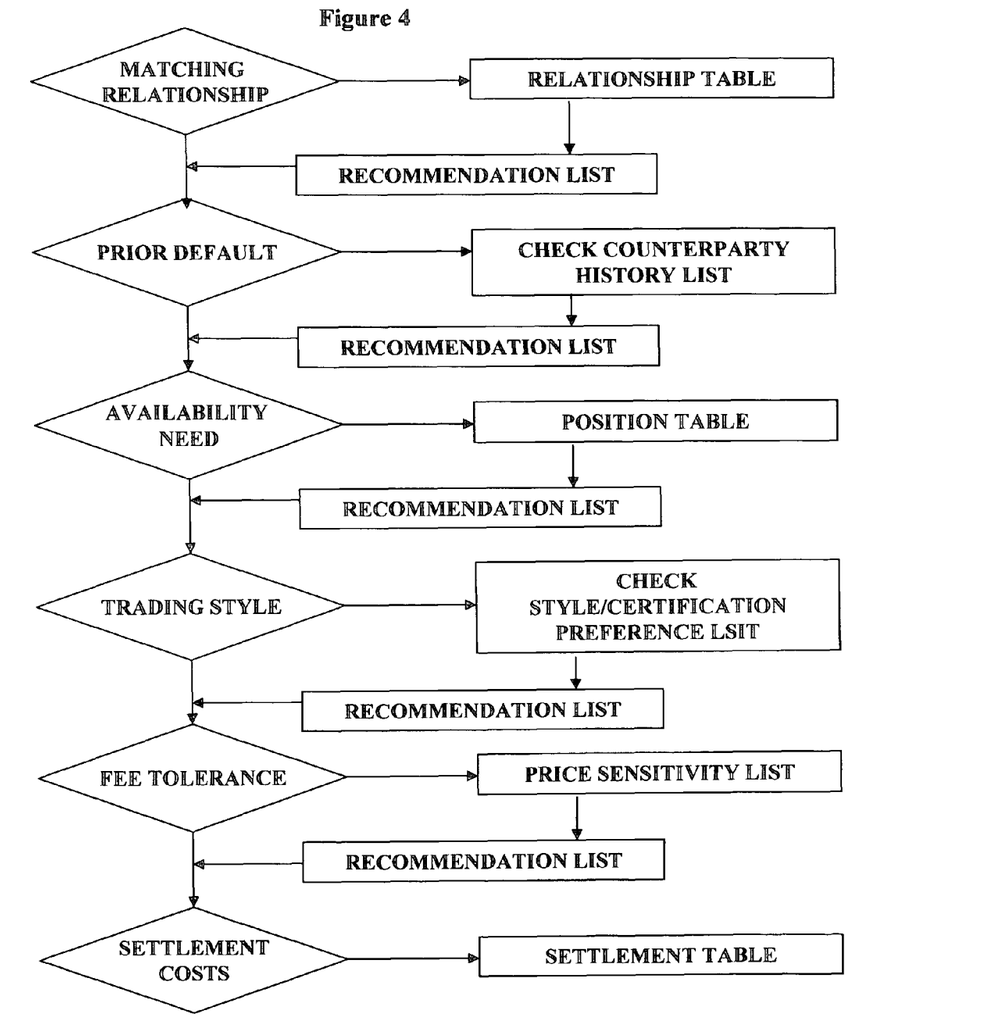
FIG. 4 illustrates one aspect of the matching process of the present invention.

FIG. 4 illustrates the steps used to generated a list of possible matches in accordance with one aspect of the present invention. Each of the preferred characteristics in an appropriate list of preferred characteristics is used to generate a search, for example, an SQL search of the securities lending database. For example, searches based on default history, trading activity history, relationship history can be formulated and run. Each search generates a list of counterparties who meet the criteria required by the preferred characteristics. The matching method of the present invention can either take the combined results (i.e., any counterparty meeting at least one of the preferred characteristics) and add those parties to a suggested matching list or can take only the parties meeting all of the preferred characteristics and add those parties to the suggested matching list. The last approach is preferred. The method and system of the present invention can also be applied to a single side of the transaction. In other words, the preferences of the lender alone can be measured and used to determine an appropriate financing arrangement. Similarly, the preferences of a borrower alone can also be measured and used to determine an appropriate financing arrangement. However, in accordance with a preferred embodiment of the present invention, the preferences of both borrowers and lenders are used to determine an appropriate financing arrangement.

Figure 5:
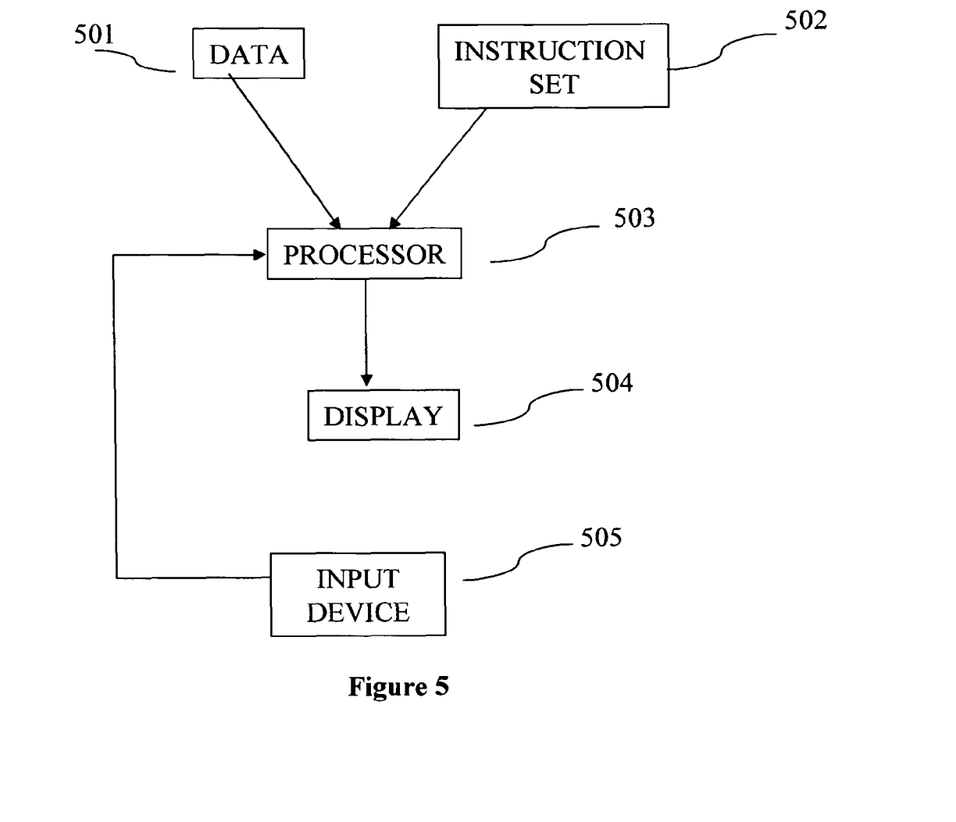
FIG. 5 illustrates a system in accordance with another aspect of the present invention.

FIG. 5 illustrates a system in accordance with one aspect of the present invention. A processor 503 is supplied with data 501 from the securities lending database. Software 502 with an instruction set operable to perform the steps set forth herein is loaded onto the processor 503. The results set forth herein can be displayed on a display 504. Input devices 505, such as a keyboard, a mouse and any other known input device, are provided to allow a user to input information.

The invention claimed is:

1. A preferred financing system for matching one of a plurality of institutional lenders of investment securities and one of a plurality of entities that borrow investment securities, comprising:

a processor and a memory that generate and store:

a first set of lists of designated recipients and preferred types of recipients of securities made available for lending, the first set of lists including a qualified subset of the plurality of institutional lenders;

a second set of lists of designated lenders and preferred types of lenders of securities made available for lending, the second set of lists including a qualified subset of the plurality of entities that borrow investment securities;

a third set of lists, the third set of lists including a list for each of the plurality of lenders, each list in the third set of lists indicating one or more preferred characteristics of a potential borrower for one of the plurality of lenders;

a fourth set of lists, the fourth set of lists including a list for each of the plurality of traders and investment companies, each list indicating one or more preferred characteristics of a potential lender for one of the plurality of investment companies, the preferred characteristics of a potential lender including a degree to which any prior defaults on a commitment to lend or to consummate a preferred type of securities lending transaction by a lender is important;

the processor accessing the first through fourth set of lists in the memory to generate one or more suggested matches between one the plurality of lenders and one of the plurality of investment houses in accordance with information in the first list, in the second list, in the third list and in the fourth list; and a communication circuit that communicates the one or more suggested matches to an intermediary.

2. The system as claimed in claim 1, further comprising means for receiving information concerning a securities lending transaction when the securities lending transaction is based on the one or more suggested matches and is consummated.

3. The system as claimed in claim 1, wherein one of the one or more characteristics in each list in the third set of lists is a pre-qualification rating of the degree to which the type of relationship(s) a lender has to a borrower is important.

4. The system as claimed in claim 1, wherein one of the one or more characteristics in each list in the third set of lists is a pre-qualification rating of the degree to which the type of relationship(s) a borrower has to a lender is important.

5. The system as claimed in claim 1, wherein one of the one or more characteristics in each list in the third set of lists is a pre-qualification rating of the degree to which any prior defaults on a commitment to lend or to consummate a preferred type of securities lending transaction by a borrower is important.

6. The system as claimed in claim 1, wherein one of the one or more characteristics in each list in the third set of lists is the degree to which a crowd of pre-qualified lenders has made available the particular security names and sizes needed by a crowd of borrowers.

7. The system as claimed in claim 1, wherein one of the one or more characteristics in each list in the third set of lists is the degree to which a crowd of pre-qualified borrowers has stated a need for the particular security names and sizes made available by crowd of lenders.

8. The system as claimed in claim 1, wherein one of the one or more characteristics in each list in the third set of lists is the degree to which the qualification rating of investment, collateral management and settlement styles for each pre-qualified available lender is important.

9. The system as claimed in claim 1, wherein one of the one or more characteristics in each list in the third set of lists is the degree to which the qualification rating of trading, collateral management and settlement styles of each pre-qualified needy borrower is important.

10. The system as claimed in claim 1, wherein one of the one or more characteristics in each list in the third set of lists is the degree to which a qualified, available lender is price sensitive and risk tolerant.

11. The system as claimed in claim 1, wherein one of the one or more characteristics in each list in the third set of lists is the degree to which a qualified, needy borrower is price sensitive and risk tolerant.

12. The system as claimed in claim 1, wherein one of the one or more characteristics in each list in the third set of lists is the degree to which a qualified, available lender's settlement requirements are important.

13. The system as claimed in claim 1, wherein one of the one or more characteristics in each list in the third set of lists is the degree to which a qualified, needy borrower's settlement requirements are important.

14. A method of using a computer to provide preferred financing decisions with respect to a security for a plurality of potential lenders of the security and for a plurality of potential borrowers of the security, comprising:

the computer generating a list of the plurality of potential borrowers of the security;

the computer generating a list of the plurality of potential lenders of the security;

the computer generating a list of preferred characteristics of each of the potential borrowers of the security for each one of the plurality of lenders of the security, the computer generating a list of preferred characteristics of each of the potential lenders of the security for each one of the plurality of borrowers, the preferred characteristics of a potential lender of the security including a degree to which any prior defaults on a commitment to lend or to continue a preferred type of securities lending transaction by a lender of the security is important;

the computer accessing each of the lists to generate a plurality of matches between one or more of the plurality of borrowers of the security and one or more of the plurality of lenders of the security; and the computer communicating the plurality of matches to an intermediary.

15. The method as claimed in claim 14, wherein one of the preferred characteristics of the potential lender is a pre-qualification rating of the degree to which the type of relationship(s) a lender has to a borrower is important.

16. The method as claimed in claim 14, wherein one of the preferred characteristics of the potential borrower is a pre-qualification rating of the degree to which the type of relationship(s) a borrower has to a lender is important.

17. The method as claimed in claim 14, wherein one of the preferred characteristics of the potential borrower is a pre-qualification rating of the degree to which any prior defaults on a commitment to lend or to consummate a preferred type of securities lending transaction by a borrower is important.

18. The method as claimed in claim 14, wherein one of the preferred characteristics of the potential lender is a degree to which a crowd of pre-qualified lenders has made available the particular security names and sizes needed by a crowd of borrowers.

19. The method as claimed in claim 14, wherein one of the preferred characteristics of the potential borrower is a degree to which a crowd of pre-qualified borrowers has stated a need for the particular security names and sizes made available by crowd of lenders.

20. The method as claimed in claim 14, wherein one of the preferred characteristics of the potential lender is a degree to which the qualification rating of investment, collateral management and settlement styles for each pre-qualified available lender is important.

21. The method as claimed in claim 14, wherein one of the preferred characteristics of the potential borrower is a degree to which the qualification rating of trading, collateral management and settlement styles of each pre-qualified needy borrower is important.

22. The method as claimed in claim 14, wherein one of the preferred characteristics of the potential lender is a degree to which a qualified, available lender is price sensitive and risk tolerant.

23. The method as claimed in claim 14, wherein one of the preferred characteristics of the potential borrower is a degree to which a qualified, needy borrower is price sensitive and risk tolerant.

24. The method as claimed in claim 14, wherein one of the preferred characteristics of the potential borrower is a degree to which a qualified, available lender's settlement requirements are important.

25. The method as claimed in claim 14, wherein one of the preferred characteristics of the potential lender is a degree to which a qualified, needy borrower's settlement requirements are important.

* * * * *